US006182010B1

(12) United States Patent
Berstis

(10) Patent No.: US 6,182,010 B1
(45) Date of Patent: Jan. 30, 2001

(54) METHOD AND APPARATUS FOR DISPLAYING REAL-TIME VISUAL INFORMATION ON AN AUTOMOBILE PERVASIVE COMPUTING CLIENT

(75) Inventor: Viktors Berstis, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/239,243

(22) Filed: Jan. 28, 1999

(51) Int. Cl.[7] .................................................. G01C 21/00
(52) U.S. Cl. ..................... 701/211; 701/213; 342/357.06; 340/995
(58) Field of Search ..................... 701/211, 213, 701/208; 340/995; 342/357.1, 357.06, 357.08, 357.13; 709/203

(56) References Cited

U.S. PATENT DOCUMENTS

| 4,737,916 | | 4/1988 | Ogawa et al. . | |
|---|---|---|---|---|
| 4,937,751 | * | 6/1990 | Nimura et al. | 701/211 |
| 5,121,326 | * | 6/1992 | Moroto et al. | 701/212 |
| 5,191,532 | | 3/1993 | Moroto et al. . | |
| 5,293,163 | | 3/1994 | Kakihara et al. . | |
| 5,414,629 | | 5/1995 | Inoue . | |
| 5,729,109 | | 3/1998 | Kaneko et al. . | |
| 5,732,074 | * | 3/1998 | Spaur et al. | 370/313 |
| 5,859,666 | | 1/1999 | Manabe . | |
| 5,948,040 | * | 9/1999 | DeLorme et al. | 701/201 |
| 5,959,577 | * | 9/1999 | Fan et al. | 342/357.13 |
| 5,982,298 | * | 11/1999 | Lappenbusch et al. | 340/905 |
| 6,009,363 | * | 12/1999 | Beckert et al. | 701/33 |
| 6,032,089 | * | 2/2000 | Buckley | 701/36 |

FOREIGN PATENT DOCUMENTS 64-17200 * 1/1989 (JP) .
9-166450 * 6/1997 (JP) .

OTHER PUBLICATIONS

Jameel et al.; Internet multimedia on wheels: connecting cars to cyberspace; IEEE Conference–Intelligent Transportation System; Nov. 9–12 1997; pp. 637–642.*
Jameel et al; Web on wheels: toward Internet–enabled cars; IEEE Computer; Jan. 1998, vol. 31, iss. 1; pp. 69–76.*

* cited by examiner

Primary Examiner—Michael J. Zanelli
(74) Attorney, Agent, or Firm—Jeffrey S. LaBaw; David H. Judson

(57) ABSTRACT

A navigation system, preferably for use in a vehicle. The system includes a processor, and a graphical display for displaying map information. As the vehicle approaches a given location, e.g., an intersection, a visual image of the location is retrieved and displayed on the graphical display. In one embodiment, the visual image is a photograph of the location that is displayed in a pop-up window on the display screen. If desired, additional graphic images or text are superimposed on or associated with the image to facilitate navigation. Thus, for example, if the user were approaching an intersection, the invention displays a still photograph of the intersection, together with an arrow overlaid thereupon to illustrate that the user should make a given turn.

23 Claims, 4 Drawing Sheets

METHOD AND APPARATUS FOR DISPLAYING REAL-TIME VISUAL INFORMATION ON AN AUTOMOBILE PERVASIVE COMPUTING CLIENT

BACKGROUND OF THE INVENTION

1. Technical Field

This invention relates generally to in-vehicle navigation systems and, in particular, to a method and system for displaying visual images on a portable computing device to assist a user in locating traffic landmarks.

2. Description of the Related Art

Recently, the computer industry has sought to add computer processing and communications capabilities to devices other than what would normally be considered a traditional computer. Such devices are quite varied and include, for example, personal digital assistants (PDAs), smartphones, cellular phones, desktop screen phones, in-vehicle devices, vehicle traffic lights, kiosks, business organizers (e.g., IBM WorkPadT™, PalmPilot™, and the like), computer peripherals (such as printers, fax machines, and the like), handheld or palmtop computing devices, and the like. For convenience, these devices, as a class, are referred to herein as "pervasive computing" clients as they are devices that are designed to be connected to servers in a computer network and used for computing purposes regardless of their location.

Palmtop computers and the like are now being proposed as pervasive computing devices for use in an automobile. In-vehicle navigation systems, of course, are well-known. Representative systems are described in U.S. Pat. Nos.: 5,121,326, 5,191,532 and 5,792,109. U.S. Pat. No. 5,121,326 describes a navigation system that displays a general map of the driver's location. As the driver approaches an intersection, the display provides a detailed map of the intersection to provide further guidance to the driver. In U.S. Pat. No. 5,191,532, a navigation system is disclosed where driving directions can be provided even though the user's exact destination is not listed in the systems database. Certain geographic features such as cities and landmarks are used to approximate the destination for purposes of providing directions. In U.S. Pat. No. 5,729,109, the inventors provide a vehicle navigation system that uses speech generation to give spoken directions when the driver is approaching an intersection.

Although such existing in-vehicle navigation systems are useful for their intended purpose, the user interface for such devices is often fairly crude. Typically, the interface comprises a grid or map illustrating various roads, streets and intersections. Occasionally, these maps include other identifying information. Thus, while a user may be provided with some useful information from such displays, maps are often confusing, especially at some complex intersections. Moreover, these types of displays generally do not always provide sufficient information so as to enable a user to accurately determine if the vehicle has reached a given location represented on the map.

The present invention addresses the need to provide improved in-vehicle display of navigation information.

BRIEF SUMMARY OF THE INVENTION

An object of the present invention is to provide accurate visual information to a driver in using a navigation system to allow the driver to more accurately assess his or her position relative to an intersection or other physical location where an action may need to be taken.

It is a further object to provide a vehicle navigation system with the capability of displaying a visual identification (e.g., a photograph) consistent with the driver's then-current perspective to allow for more accurate and intuitive decision making during the course of navigating a vehicle.

It is a yet another object of the present invention to provide a more useful in-vehicle navigation system that displays information automatically so that a user has more complete data available at an earliest possible time prior to a decision point.

A more general object of the present invention is to provide an improved vehicle navigation display system and interface.

Another general object of this invention is to provide still photographs or real-time videos of physical landmarks in conjunction with display of a navigation grid or map in a vehicle or handheld navigation system.

These and other objects of the invention are provided in a navigation system, preferably for use in a vehicle. The system includes a processor, and a graphical display for displaying map information. As the vehicle approaches a given location, e.g., an intersection, a visual image of the location is retrieved and displayed on the graphical display. In one embodiment, the visual image is a photograph of the location that is displayed in a pop-up window on the display screen. If desired, additional graphic images or text are superimposed on or associated with the image to facilitate navigation. Thus, for example, if the user were approaching an intersection, the invention displays a still photograph of the intersection, perhaps with an arrow overlaid thereupon to illustrate that the user should make a given turn.

Each location may have a set of photograph images associated therewith. Thus, for example, a given intersection is photographed at different times of day and/or at different times of the year. This enables the user to be provided with the most accurate representation of the location as the user approaches. If sufficient processing capability is available in the vehicle navigation system and the content is otherwise available, the system may be selectively controlled to display video images of the physical location. This would be quite helpful in the situation wherein physical elements in the scenery are consistently changing.

Preferably, the image content is collected by other vehicles (e.g., police cars, delivery vehicles, taxi cars, post office vehicles, etc.) and stored on given physical media within a user's vehicle (e.g., as a CD-ROM, or the like), or such information may be stored in a server. In the latter case, the in-vehicle system connects to the server (e.g., via a wireless connection) and receives the desired content for display on the user's computer.

The inventive display method may also be practiced in other environments. Thus, for example, the method may be implemented in a handheld or mobile computer that includes a global positioning system (GPS) or the like for displaying the position of the device. In such case, a grid or map may be displayed on the computer screen. When the user approaches some location of interest, a photographic image is displayed, e.g., in a pop-up window, as a visual association of the user's position with some actual physical location.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
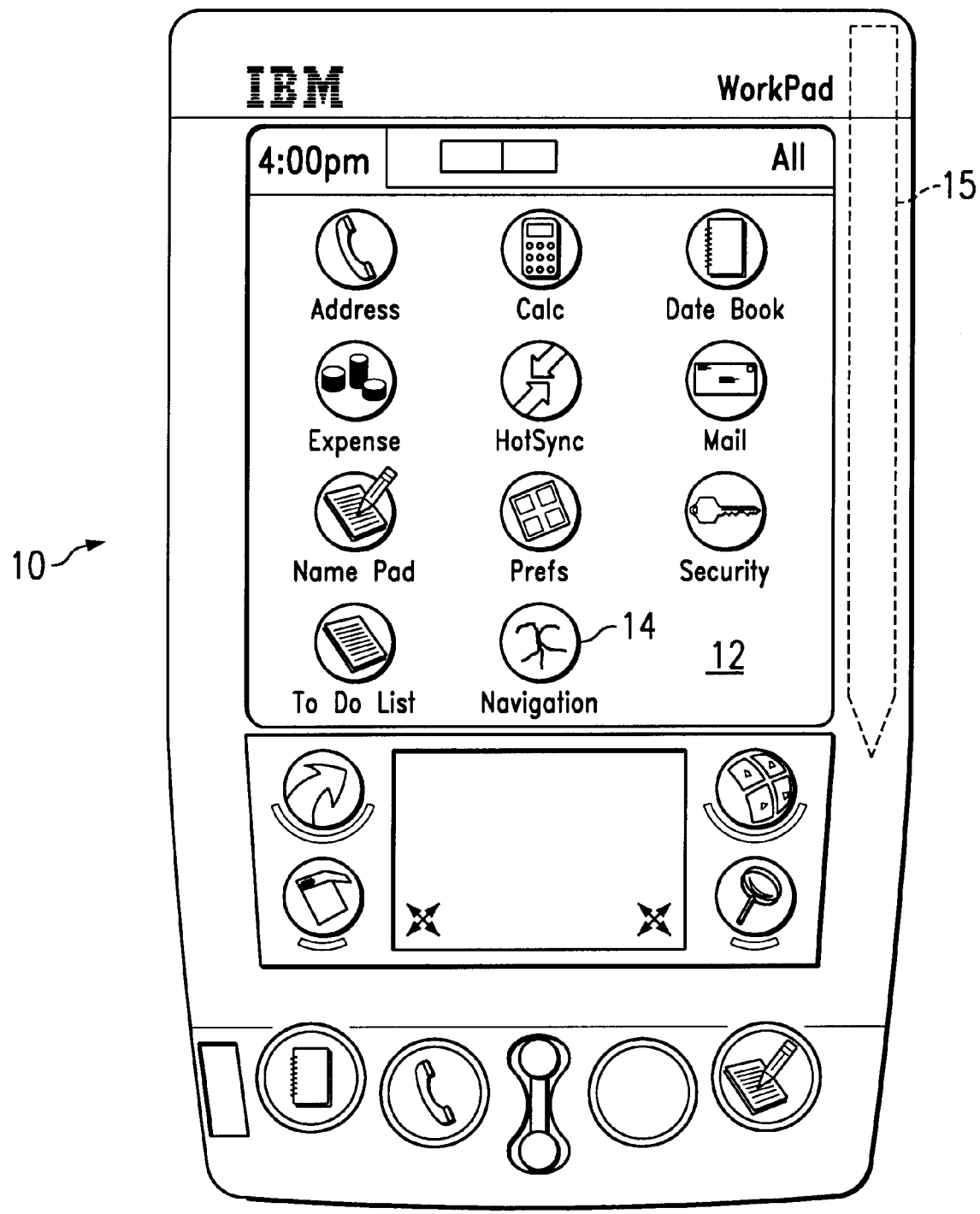
FIG. 1 is a view of a example pervasive computing device useful for implementing the present invention.

The present invention provides a novel navigation data processing and display device, system and method. Preferably, the invention is implemented in a mobile computer, such as a pervasive computing client, connectable to a computer network. FIG. 1 illustrates a representative pervasive computing client device 10 having a graphical display 12. The device also includes a handheld stylus 15 for inputting information to the device. A representative handheld device in which the present invention is implemented is a palmtop computer, for example, a device marketed by the IBM Corporation under the WorkPad trademark. One of ordinary skill, however, will appreciate that the principles of the invention are generally applicable to a pervasive computing client. Representative devices include a pervasive client that is x86-, PowerPC®- or RISC-based, that includes a real-time operating system such as WindRiver VXWorks™, QSSL QNXNeutrino™, or Microsoft Windows CE, and that includes a browser.

Figure 2:
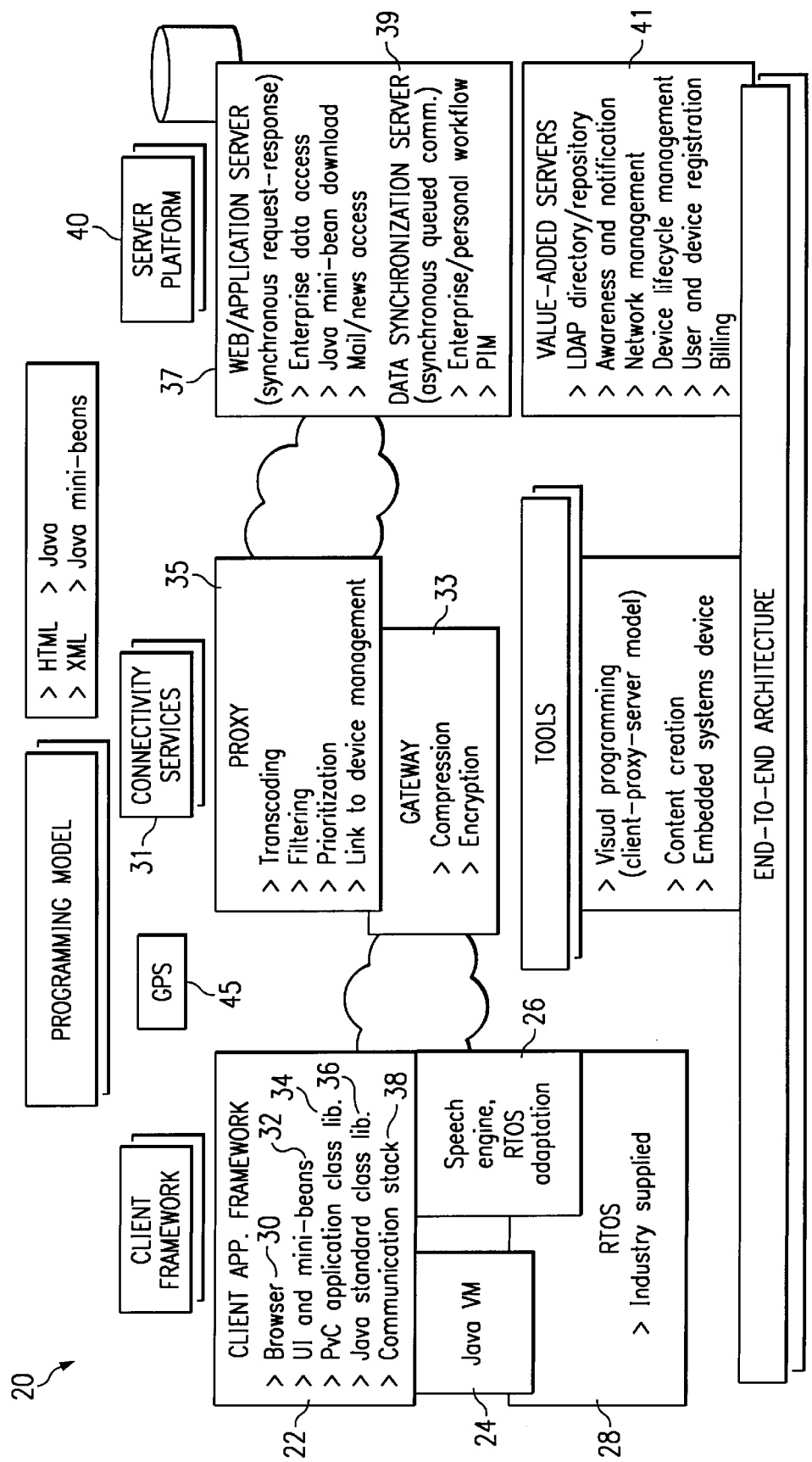
FIG. 2 is a diagram of a representative client-server architecture in which the pervasive computing client of the present invention is used.

Referring now to FIG. 2, a representative pervasive computing device comprises client stack 20 including a number of components, for example, a client application framework 22, a virtual machine 24, a speech engine 26, and an industry-supplied runtime operating system (RTOS) 28. The client application framework 22 typically includes a browser 30, a user interface 32, a pervasive computing client application class library 34, a standard Java class library 36, and a communication stack 38. The pervasive computing client connects to a server platform 40 via a wireless data link 42.

The pervasive computing client preferably includes a global positioning system (GPS) receiver 45. Recently, such receivers have become readily available on a widespread commercial basis as integrated circuit devices. Such devices provide latitude and longitude data to within a given tenth of a second of arc. When greater accuracy is required, the accuracy of the position measurement is enhanced using differential GPS (or dGPS), a process in which a number of fixed reference points are used. In dGPS, the positions of the reference points are determined with great precision, e.g., using surveying techniques. A GPS is used to obtain the location of a given reference point, and this measurement is compared with known location to generate a correction value that is then used to correct the position of the pervasive device as measured by GPS.

Returning back to FIG. 2, at its lower level, the connectivity service 31 includes a gateway 33 that provides compression and encryption functions. The upper level of the connectivity service 31 is a proxy 35 that provides several different functions: transcoding, filtering, prioritization and link to device management. Transcoding refers to the translation from one source markup language to another markup language. Transcoding is required because a pervasive computing client normally does not support the full function set of an HTML Windows-based client. In such case, it is necessary to transcode the HTML-based file into a format (e.g., HDML or handheld device markup language) compatible with the pervasive client computing device so that the file may be appropriately rendered on the client.

The server platform 40 may be of several different types. The platform 40 may be a Web/application server 37 (a synchronous request-response type server) or a data synchronization server 39 (an asynchronous queued communication type server). The basic functions are each such server type are illustrated. Alternatively, the platform 40 may be a value-added server 41 that provides additional services such as LDAP directory/repository, awareness and notification, network management, device life cycle management, user and device registration, or billing.

The particular server is typically one of a plurality of servers which are accessible by clients, one of which is illustrated by the pervasive computing client having a browser, as previously noted. A representative Web server is an IBM Netfinity™ server comprising a RISC-based processor, the AIX® operating system and a Web server program, such as Netscape Enterprise Server.

A representative server also includes a display supporting a graphical user interface (GUI) for management and administration, and an Application Programming Interface (API) that provides extensions to enable application developers to extend and/or customize the core functionality thereof through software programs including Common Gateway Interface (CGI) programs, plugins, servlets, active server pages, server side include (SSI) functions or the like.

The inventive functionality of the pervasive computing client 10 is preferably implemented in a software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network. This program is preferably invoked by pressing an icon 14 using the stylus 15.

According to a preferred embodiment, the pervasive computing client is a portable or so-called "palmtop" computer or PDA. Generally, the portable computing device of the invention is used as an in-vehicle navigation computer to display to the driver (or occupant) maps and other useful information. According to the invention, such other information preferably includes rich media content, such as a photographic image of a landmark located at an upcoming intersection or other location. Such content may be downloaded to the vehicle computer from a server in the network (as previously illustrated) or, alternatively, such content may be pre-recorded on a storage medium (e.g., CD-ROM, DVD, or the like) provided in the vehicle.

Figure 3:
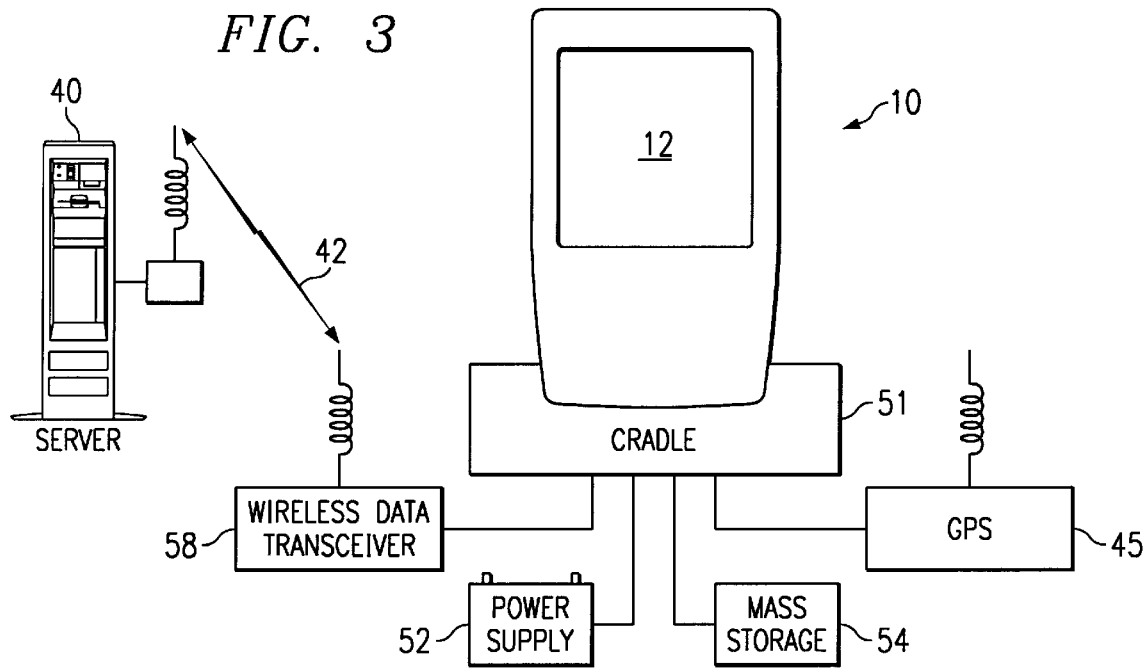
FIG. 3 is a schematic diagram of the pervasive computing device as connected in a vehicle.

The in-vehicle embodiment of the present invention is now described in more detail. In particular, FIG. 3 is a block diagram of an navigation system wherein a pervasive computing device 10 is mounted on a cradle 51 which serves at least two purposes. First, the cradle is positioned in the vehicle (not shown) to allow for good visibility of graphical display 12 to the operator or navigator of the vehicle. Second, cradle 51 provides electrical connection from the pervasive computing device to other devices mounted in the vehicle. For example, vehicles are usually equipped with high capacity power storage devices. Battery 52 is connected (through an appropriate regulator, not shown) to pervasive computing device 10. Another device connected to the pervasive device via cradle 51 is mass storage device 54. In this example, mass storage device 54 is preferably a DVD type optical disk drive. DVD disks, when used for data storage, provide very large storage capacity. This capacity is valuable in storing the high quality images that are preferably used in implementing the present invention. Mass storage device may be other types of storage devices such as a CD-ROM, a high capacity hard disk drive or flash memory card.

Cradle 51 also allows for connection to the GPS module 45. The use of the in-vehicle global positioning system (GPS) is well-known in the art, as illustrated in U.S. Pat. No. 5,862,511.

According to an alternate embodiment, the inventive display routine is implemented within a handheld pervasive computing device. Such a device may include a GPS receiver or, alternatively, internal positioning devices (e.g., an accelerometer, a pedometer, a compass, and the like). Such devices may be used to provide position and direction information to the device. In addition, the device typically includes mapping routines to illustrate various characteristics of a given geographic area. Such a mapping routine, for example, would generate an overlay image illustrating physical features and characteristics, contours, property lines, dwellings, roads, waterways, and the like. A representative system of this type is described in U.S. Pat. No. 5,699,244.

Cradle 51 also provides a connection between pervasive computing device 10 and wireless data transceiver 58. Wireless data transceiver 58 allows for establishment of wireless data link (as seen in FIG. 2) to a data network allowing establishment of client/server communications to and from server 40. The communications link can be provided using one of several known wireless data transmission technologies such as CDMA, GSM, TDMA, CDPD, and Mobitex.

Figure 4:
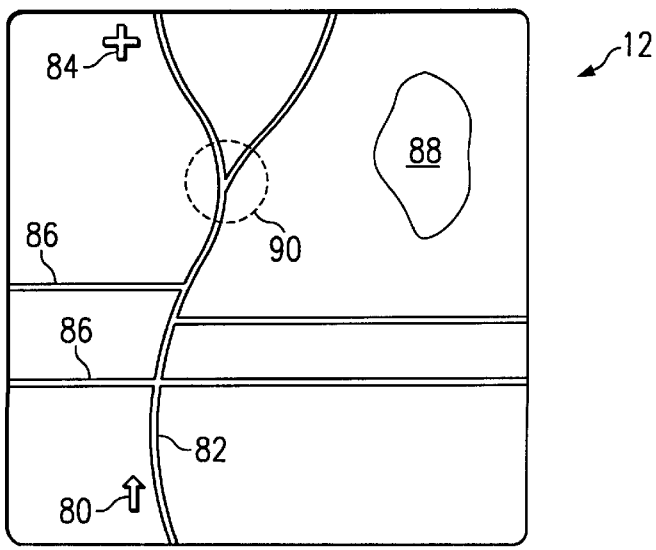
FIG. 4 is an illustrative display of a map provided in a representative embodiment of the present invention.

FIG. 4 depicts an illustrative display on graphical display 12 of the pervasive device. In this example, direction arrow 80 indicates the direction of travel along a road 82. The destination is represented, for example, by cross 84. Other features such as roads 86 and lake 88 are also depicted. Preferably, the vehicle's location along the route is displayed and updated continuously in real-time or according to some given time interval (e.g., every 5 seconds). For the sake of this example, an important location on the vehicle's desired route is intersection 90. In developing the maps displayed using this invention, certain points may be designated as difficult to navigate. Intersection 90 is one of those points in this example.

Figure 5:
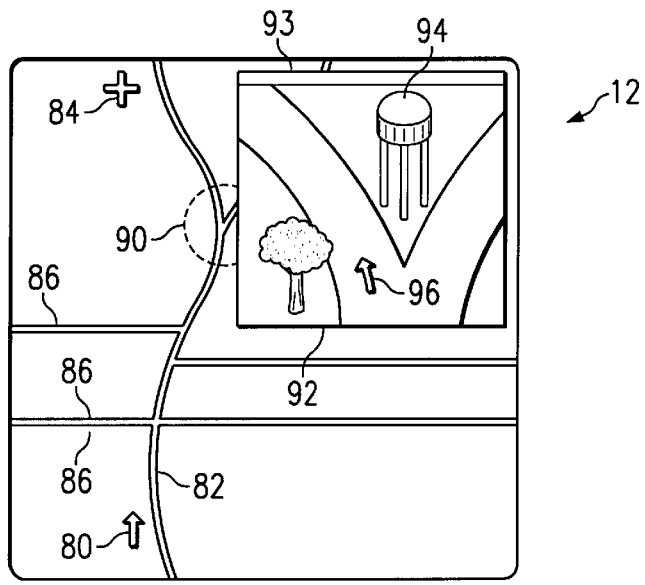
FIG. 5 is the illustrative display of FIG. 4 that has been augmented to display a photographic image according to the teachings of the present invention.

When the vehicle reaches a selected distance (or time) away from intersection 90, a display function in the device is invoked to fetch a photographic image 92 of intersection 90 depicting the impending scene. This image is then displayed as shown in FIG. 5. The graphical image 92 in this example provides aid to the driver of the vehicle by allowing him or her to see landmarks, such as water tower 94 and tree 96, at the critical location 90 in their natural perspective. The image may be of any convenient format (e.g., .jpeg, gif, .png. or the like) that may be readily transmitted (if required), stored and displayed. In an illustrative embodiment, the image is displayed in a pop-up window 93 on graphical display 12. Preferably, the window is generated by the device's browser. Alternatively, if the device does not include a browser, a separate window may be created by the device's operating system.

In accordance with the present invention, the photographic image is preferably as close as possible to the real-time conditions that the driver is encountering during the drive. Thus, for example, if the driver is approaching the location at night, or during the Winter months, the photograph displayed represents the most accurate representation of the physical area. In this way, the device provides the user with both a graphical representation or navigation map, together with an actual representation of what physical landmarks are coming into the user's field of vision. If desired, the graphical display may provide other reference aids, such as display graphics (such as arrows and pointers) or the like, to further assist the user to navigate to the desired location. Alternatively, the display system may generate a voice-over (e.g., using a text-to-speech processor) that generates an audio cue.

To provide a concrete example, the in-vehicle display system displays a grid, a photograph, and a visual cue. An audio overlay (e.g., "as you can see by the image, you are now arriving at the intersection of Main and Commerce. You should now turn right"). As illustrated in FIG. 5, direction arrow 96 is superimposed on the graphical image to further aid to the driver.

Given images to be displayed are retrieved from data storage in the vehicle (e.g., in a CD-ROM or DVD format) or are otherwise selectively downloaded to the pervasive computing client via the wireless network.

Preferably, the given photographic image is displayed when the user reaches a given position relative to the location of interest. Thus, in the example of FIGS. 4–5, the photographic image is displayed at a certain point in time, or when the vehicle reaches a certain position in advance of the intersection, to enable the driver to have sufficient time (given the driving conditions, the speed or travel and the distance) to make an informed navigation decision.

These photographs can be gathered for the navigational system in a number of ways. A preferable way is the use of a digital camera (such as that shown in U.S. Pat. No. 5,859,666, which is incorporated herein by reference, mounted to vehicles which regularly travel the area, for example, police, public transportation, emergency, taxi or delivery vehicles. The use of such cameras with police vehicles is particularly advantageous because photographic evidence taken from police vehicles aids the police in their work.

In an illustrative embodiment, the photographs are collected as follows. Additional details regarding this technique in Applicant's copending application titled "Video Camera With Position And Orientation Recording To Assist In Authoring Virtual Reality Scenes." That application is incorporated herein by reference. It is identified as Ser. No. 09/240,925. In that technique, a video camera is provided on a tracking vehicle. The video camera is augmented with a set of accelerometers or, alternatively, accelerometers in combination with a set of gyroscopes, and, optionally, a GPS receiver. For each frame of video picture taken, the camera's location and orientation are recorded along with the picture. The video is subsequently digitized, possibly compressed, and stored in a computer's hard disk drive or other storage media. The frames are then sorted out by location and orientation and organized into an accessible data structure. This information is then subsequently used to facilitate display of the additional navigation images as has been previously described.

In a preferred embodiment, graphical image 92 is stored in a local mass storage device such as mass storage device 54. Preferably, mass storage device 54 is a DVD ROM device. Disks can be stored which provide the images for an entire region. Local storage of the images provides for rapid retrieval and display. An alternative is to store the images in a server system provided by server 40 (as in FIG. 3). This approach provides nearly limitless storage, but it may have lower image access rates depending on the transfer rate of the wireless data link.

Alternatively, the graphical image 92 may be a moving video image illustrating landmarks located at the intersection. As the driver approaches, the video will change the perspective to provide a more accurate viewpoint. This provides more accurate data to the driver, but requires more data. Thus, this alternative would increase the cost and complexity of the system.

Figure 6:
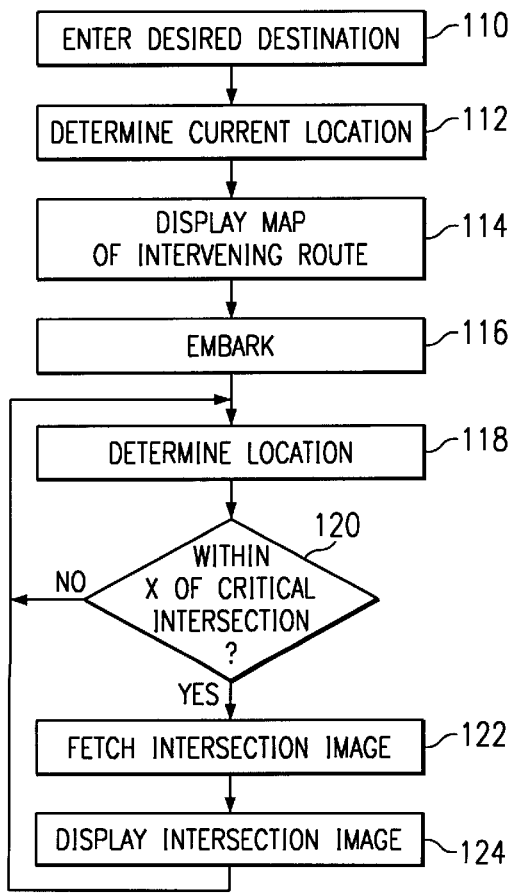
FIG. 6 is a flowchart of a preferred control routine of the present invention.

FIG. 6 is a flowchart depicting the major steps of the program executed on pervasive computing device 10 in accordance with an embodiment of the present invention. The desired destination is entered at step 110. This is preferably accomplished using stylus 15 to enter an address onto graphical display 12. The next step is determination of the current location using the GPS system as shown in step 112.

From the current location, a map of the desired route is retrieved from mass storage device 54 or server 40 and displayed on graphical display 12 as shown in step 114. The driver then embarks on the route as shown in step 116. The program then enters a continuous loop. The first step of this loop is determining the current location as the vehicle travels as shown in step 118. A determination is made of the distance from this current location to a next intersection on the route. If this distance is greater than a selected distance stored with the intersection data, step 120 is negative and the program loops to step 118.

If the vehicle is within a given distance from the intersection, the image of the intersection is fetched as shown in step 122. This image may be a perspective graphical image, a photograph or a video image. This image is displayed as shown in step 124. After the image is displayed, the program loops back to determine the new current location at step 118. If the image is a moving video image, this new current location is used to fetch the new perspective image relating to the new position at step 124. In this way, the moving video image is kept in sync with the viewpoint of the vehicle until the intersection has been passed.

Of course, the particular image displayed on the pervasive computing client display need not be limited to a street or road. The image may be of any landmark, building, sign, road, or the like.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a pervasive computing "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

1. A display method operative in a pervasive computing client having a graphical display, comprising the steps of:
   displaying a map on the graphical display;
   plotting a user's current position on the map; and
   as the user's current position approaches a given physical landmark, displaying a photographic image of the landmark, the photographic image showing real-time conditions, to assist the user's navigation.

2. The display method as described in claim 1 further including the step of retrieving the photographic image prior to the step of displaying the image.

3. The display method as described in claim 2 wherein the photographic image is retrieved from a storage media associated with the pervasive computing client.

4. The display method as described in claim 2 wherein the photographic image is retrieved from a server to which the pervasive computing client is connected.

5. The display method as described in claim 4 wherein the pervasive computing client is connected to the server via a wireless connection.

6. The display method as described in claim 1 wherein the user's current position is derived from a global positioning system.

7. The display method as described in claim 1 wherein the photographic image is a frame of a video.

8. The display method as described in claim 1 further including the step of displaying a given graphical representation indicating a desired direction of travel.

9. The display method as described in claim 1 further including the step of outputting an audio cue indicating a desired direction of travel.

10. A display method operative in an in-vehicle pervasive computing client having a graphical display, comprising the steps of:
    displaying a map on the graphical display;
    plotting a vehicle's current position on the map; and
    as the vehicle's current position approaches a given position relative to a physical landmark, selectively retrieving an image of the landmark, the image showing real-time conditions; and
    displaying the image.

11. The display method as described in claim 10 wherein the image is retrieved from a storage media associated with the pervasive computing client.

12. The display method as described in claim 10 wherein the photographic image is retrieved from a server to which the pervasive computing client is connected.

13. The display method as described in claim 12 wherein the pervasive computing client is connected to the server via a wireless connection.

14. The display method as described in claim 10 wherein the vehicle's current position is derived from a global positioning system.

15. The display method as described in claim 10 wherein the image is a photograph.

16. The display method as described in claim 15 wherein the photograph is collected in an off-line image collection process.

17. The display method as described in claim 10 further including the step of displaying a given graphical representation indicating a desired direction of travel.

18. The display method as described in claim 10 further including the step of outputting an audio cue indicating a desired direction of travel.

19. In a pervasive computing client device having a graphical display and a browser, the improvement comprising:

displaying a map on the graphical display;

plotting a user's current position on the map; and as the user's current position approaches a given physical landmark, displaying a photographic image of the landmark in the browser, the photographic image showing real-time conditions.

20. A pervasive computing client, comprising:

a processor;

a graphical display;

means for displaying a map on the graphical display;

means for plotting a user's current position on the map; and means responsive to the user's current position approaching a given physical landmark for displaying an image of the landmark, the image showing real-time conditions.

21. A computer program product in a computer-readable medium for use in a pervasive computing client device having a graphical display, comprising:

means for displaying a map on the graphical display;

means for plotting a user's current position on the map; and means responsive to the user's current position approaching a given physical landmark for retrieving and displaying an actual image of the landmark, the image showing real-time conditions.

22. The computer program product as described in claim 21 further including means for displaying a graphical representation of a navigation aid in conjunction with the actual image.

23. A method for displaying information in an in-vehicle pervasive computing client having a browser, comprising the steps of:

displaying a map representing a current location of the vehicle;

as the user approaches a given position on the map, displaying an image of a physical landmark at the given position, the image showing real-time conditions.

* * * * *